Patented Oct. 6, 1931

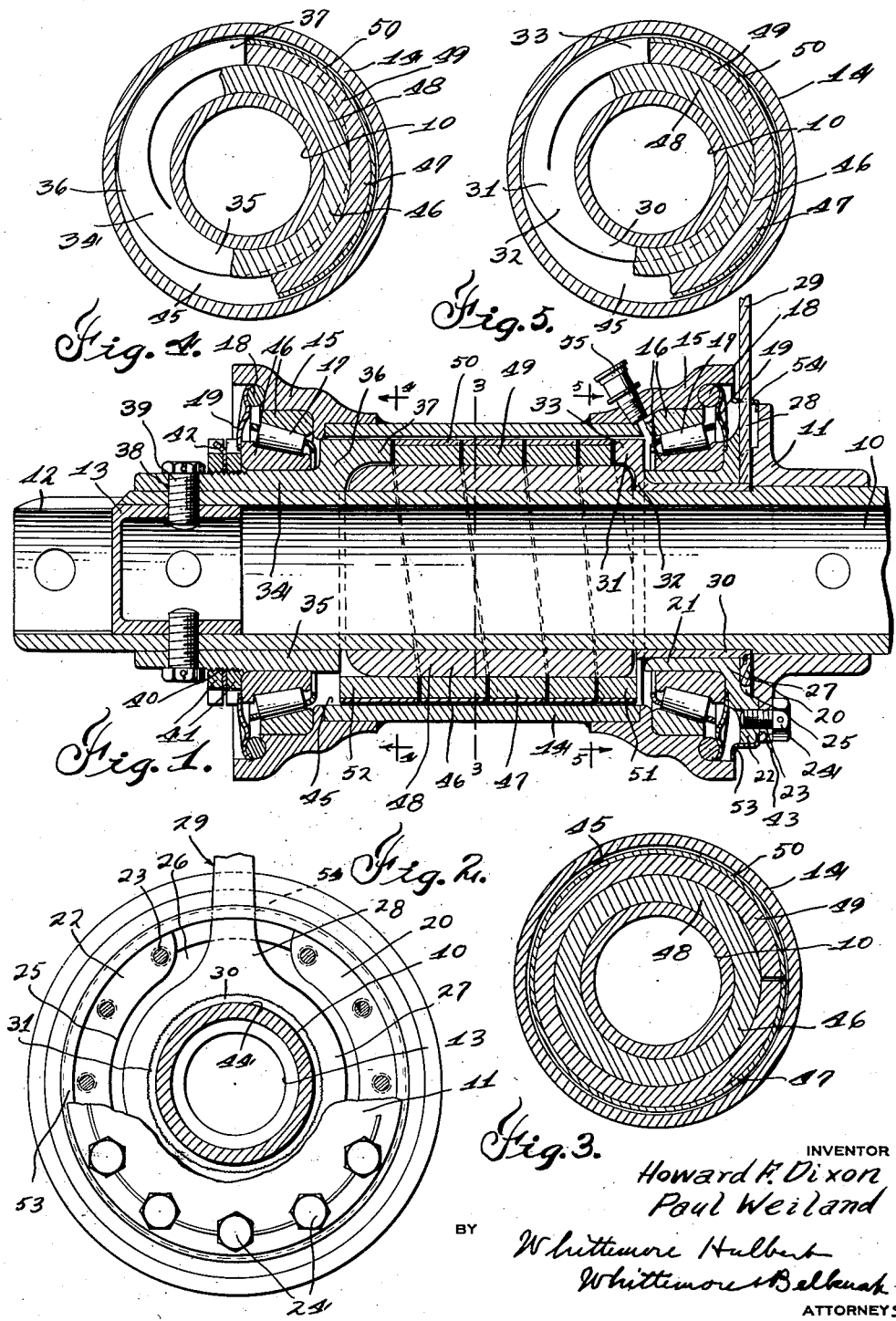

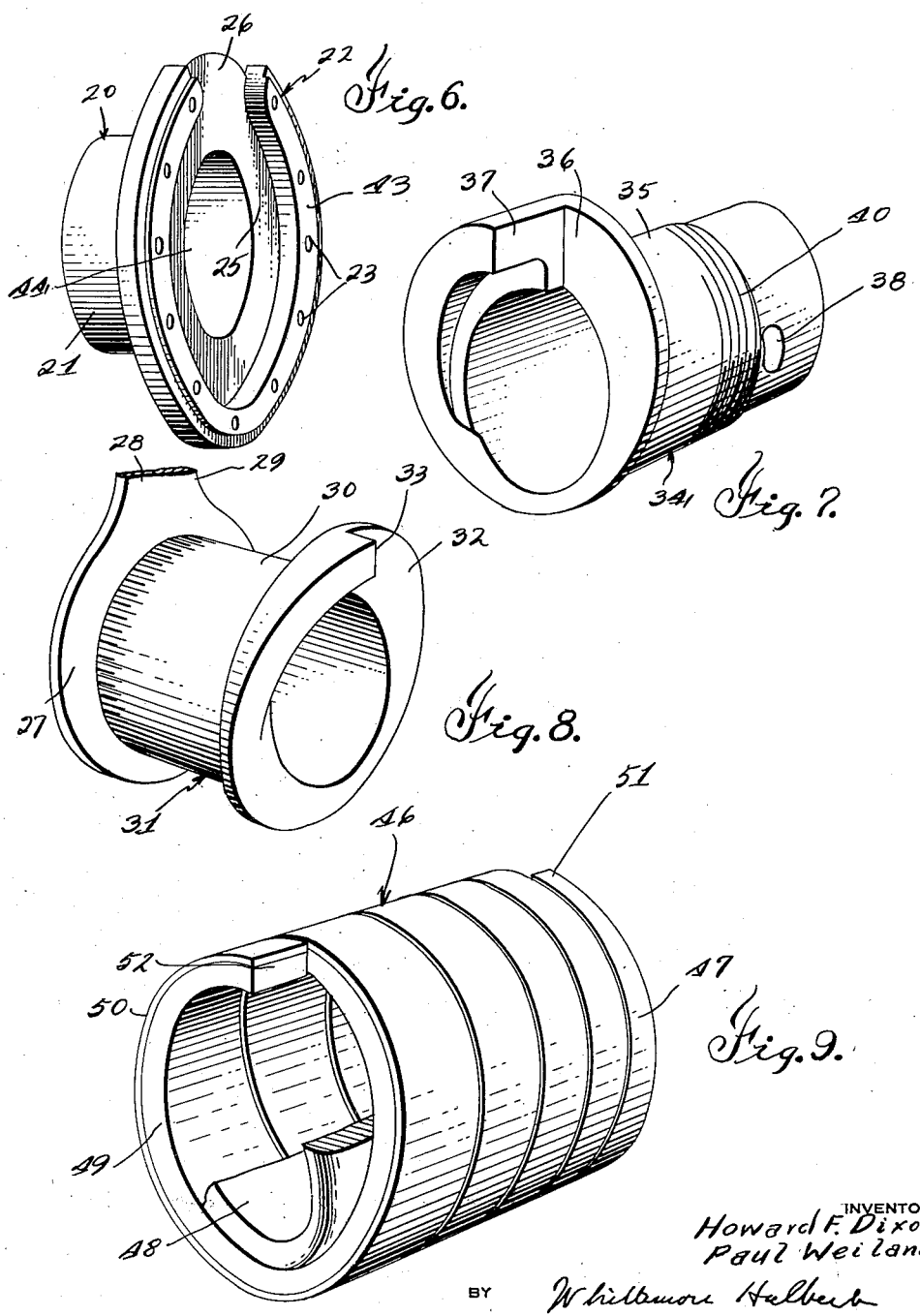

1,826,462

UNITED STATES PATENT OFFICE

HOWARD F. DIXON AND PAUL WEILAND, OF DETROIT, MICHIGAN

BRAKE MECHANISM FOR VEHICLE WHEELS

Application filed May 8, 1929. Serial No. 361,480.

The present invention relates to brake mechanisms for vehicle wheels and more especially to a brake mechanism whose organization, construction and arrangement of parts adapts it particularly for use in connection with aircraft wheels.

This application constitutes a continuation in part of our application, Serial No. 242,461, filed December 24, 1927.

One of the objects of this invention is to provide a light, efficient and partially self-energizing braking mechanism, which by reason of its construction lends itself advantageously to association with aircraft wheels and to this end contemplates a construction capable of being located and contained within the hub of the wheel, whereby protruding elements or parts such as brake drums and the like are eliminated and wind resistance reduced to a minimum.

Another object of the invention is to provide a brake construction in which the braking element consists of a coil whose convolutions taperingly increase in width from one end of the coil to the other, whereupon a differential braking action may be uniformly produced in direct dependence upon the braking effort imparted to the braking coil by means of the brake lever.

The invention has as a further object to provide a construction wherein the braking coil is adequately freely supported in its inoperative position and the heat generated therein and thereby absorbed.

Still another object of the invention is to provide a brake of the character described, which by reason of the construction of its braking element is progressively self-energizing.

The invention also numbers among its objects to simplify, render more efficient and improve generally structures of this character and to this end consists in the novel combination, construction and arrangement of parts, all of which will be made more apparent as this description proceeds, especially when considered in connection with the accompanying drawings wherein:

Figure 1 is a longitudinal sectional view through the hub of a wheel with our invention associated therewith, Figure 2 is an end elevation as seen from the right of Figure 1, partly in vertical section and partly broken away, Figure 3 is a transverse sectional view taken substantially on the plane indicated by line 3—3 in Figure 1, Figure 4 is a transverse sectional view taken substantially on the plane indicated by line 4—4 of Figure 1, looking in the direction of the arrows, Figure 5 is a transverse sectional view taken substantially on the plane indicated by line 5—5 in Figure 1, looking in the direction of the arrows, Figure 6 is a perspective view of the adapter, Figure 7 is a perspective view of the receiving cam, Figure 8 is a perspective view of the actuating cam and a portion of the brake lever and Figure 9 is a perspective view of the brake coil assembly.

Referring now more particularly to the drawings, wherein like reference characters indicate like parts, it will be noted that there is illustrated, see more particularly Figure 1, an axle 10 supported by a portion of the frame of the aircraft, as for instance by means of the torque reacting plate 11. The outer end of the axle may be extended to provide a portion 12 with which, in some types of aircraft, the raising mechanism for the landing gear may be engaged. The end of the axle proper is closed by means of a plug 13.

Rotatably mounted on the axle 10 is the hub of the wheel, this hub comprising a barrel 14 and integrally attached spoke flanges 15, to which the spokes (not shown of the wheel are attached. While in the illustrative embodiment of the invention described herein, a wire wheel is shown it will be immediately apparent that a disk wheel or any other type of wheel may be substituted. Located within the spoke flanges at both ends of the hub are raceways 16 for roller bearings 17. While in the embodiment of the invention herein illustrated tapered rollers are illustrated, it is obvious that any desired or preferred type of bearings may be employed. Also associated with each end of the hub is an annular packing ring or member 18 held in place by means of a grease retainer 19.

The inner race 16 for the bearings at the inner end of the hub is supported and mounted directly upon an adapter 20 which as shown in Figure 6 comprises essentially an axially extending annular portion 21 and a radially extending flange or portion 22. The annular portion 21 directly supports the inner race of the adjacent hub bearing and the radial flange 22 is provided with a plurality of threaded apertures 23 by means of which attachment is made by a plurality of bolts 24 with the frame part 11. The radial flange 22 is formed with an annular recess 25 and with a communicating lateral opening 26 to accommodate the hub 27 and stem 28 of brake lever 29. The hub 27 of the brake lever is rigidly fixed, as for instance by means of splines to the tubular sleeve like portion 30 of an actuating member 31. This actuating member comprises, in addition to the tubular portion 30, an integral radially extending flange 32 provided with a lateral abutment or shoulder 33 for a purpose to be more fully hereinafter referred to.

Adjacent the other end of the hub is a receiving member 34 which comprises a tubular portion 35 and a radially extending flange 36, the latter being formed with a shoulder or abutment 37, companion to the abutment 33 of the actuating member 31. The receiving member 34 is fixed rigidly to the axle 10 and for this purpose the tubular portion 35 thereof is provided with apertures 38 to receive bolts 39 adapted to be passed therethrough and through the end of the axle and into the plug 13. This tubular portion also receives the inner race of the adjacent hub bearing and is further provided with threads 40 for engagement by lock nuts 41, a lock washer 42 being provided for preventing accidental disengagement of the nuts 41. Any end thrust on the hub, is taken up by the hub bearings and the whole structure is assembled on the axle from the end thereof with the annular face 43 of the adapter 20 bearing against the torque reacting plate 11, the entire structure being held in place by the bolts 39.

The tubular portion 30 of the actuating member 31 extends through the bore or central opening 44 of the adapter 20 and is freely rotatable therein by the brake lever 29. An important function of the adapter is to take the weight of the hub at that end as transmitted through the bearings and to prevent any binding action on the actuating member that might prevent the ready manipulation thereof.

The organization of the parts heretofore described is such as an elongated annular space 45 is provided between the axle 10 and the inner surface of the hub barrel 14 and within this annular space we locate the brake coil assembly 46 illustrated separately most clearly in Figure 9. This braking element consists essentially of a spiral coil 47 and a retaining sleeve 48. The coil 47 is formed preferably principally of steel 49 with a bronze facing 50. The convolutions of the coil gradually increase in width from the movable end 51 to the anchored end 52. By holding coil end 52 and moving end 51 in the circumferential direction of its convolutions, the coil is unwound and expanded against the inner surface of the hub barrel 14.

For this purpose the abutment or shoulder 33 of actuating member 31 engages movable end 51 of the coil, and abutment or shoulder 37 of the receiving member 34 engages the stationary end 52 of the coil so that the above described unwinding and braking action of the coil will take place upon a movement of the actuating cam in the proper direction.

By gradually tapering or increasing the width of the succeeding convolutions of the coil, a differential braking action is made possible depending upon the amount of rotative pressure exerted upon the coil by the actuating cam 31. Thus during light braking either the first convolution, or succeeding several convolutions will become operative and because of the relatively narrow, but increasing width of the first several convolutions, the braking effort applied will increase progressively depending upon the number of convolutions in engagement with the hub barrel, as will be apparent.

By reason of the construction the brake is also self-energizing in that the engagement of the braking coil with the inner surface of the hub barrel, while the latter is rotating, tends to exert an unwrapping force upon the spiral braking element which tends to force the same into braking engagement with the hub barrel. It will also be understood that by reason of the increasing width of the spiral braking element, this self-energization takes place progressively.

It is important that the braking element comprises a unit construction easily assembled with the axle and properly supported thereon during its inoperative period. For this purpose, the coil retaining sleeve 48 is employed and in practice it has been found efficient to form this retaining sleeve of aluminum, but obviously any other suitable or preferred material may be substituted. The interior diameter of the retaining sleeve 48 is such that the sleeve may freely rotatably engage the axle 10. In the inoperative position of the braking coil 46 it is tightly wrapped about the retaining sleeve 48 and held in immediate readiness for engagement with the hub barrel. Because of the retaining sleeve, the coil can not contract beyond predetermined limits to thereby grip or otherwise engage the axle. Inasmuch as it frequently occurs that considerable heat is generated when a long application of the brake has occurred, the retaining sleeve 48 acts also as a heat absorbing medium, which effectively cools the braking coil.

It will be understood that the unwrapping force exerted upon the coil will be in the direction of rotation of the hub with which the coil is associated.

In Figure 1, it will be seen that there is illustrated a dust shield 53 closing the space between the adjacent edge of spoke flange 15 and the periphery of the plate 11. This dust guard is annular and of Z-shaped cross section, its inner edge being clamped between the plate 11 and the adapter 20 and its outer edge extending within and in close proximity to the adjacent spoke flange 15. The cylindrical portion of this dust guard has the peripherally extending elongated aperture 54 through which the brake lever 29 extends. With this arrangement the dust guard serves in effectively preventing the entrance of dust or other foreign material into the interior of the hub.

Suitable oiling cups 55 may be provided for introducing lubricant into the interior of the device and any other such minor accessories may be associated with the devices as found necessary or expedient.

In operation, braking is effected by swinging the brake lever 29 in a direction to force the abutment or shoulder 33 of the actuating member 31 against the adjacent end of the coil 47 and to unwind and expand this coil, the opposite end of the coil being in contact with the abutment or shoulder 37 of the stationary receiving member 34. The facing 50 of this coil during the unwinding and expanding operation is gradually brought into contact with the hub barrel 14 and in the direction of rotation of the latter, the area of the contacting surfaces being dependent upon the pressure exerted upon the brake lever.

From the foregoing, it will be readily apparent that the herein described construction provides a simple, compact and efficient brake construction, particularly adapted for use in connection with aircraft, because of the absence in the organization of pro·ruding parts which cause wind resistance. Furthermore, the construction is self-energizing and is such that the self-energization increases in direct proportion to the braking pressure initially exerted. Moreover by reason of the increase in size of the convolutions of the braking element differential braking pressures may be applied in direct proportion to the braking effort originally exerted.

While an embodiment of this invention has been described herein somewhat in detail, it will be readily apparent to those skilled in this art that various changes in many of the essential and all of the non-essential details may be resorted to without departing from the spirit and scope of the invention, and to this end reservation is made to make such changes as may come within the purview of the accompanying claims.

What we claim as our invention is:

1. An apparatus of the class described, comprising a hub member, a freely rotatable sleeve within the hub member, an expansible member supported by said sleeve when in normal position, and means to force said expansible member against the hub member.

2. An apparatus of the class described comprising a hub, an axle, an abutment within the hub and connected to the axle, a brake actuating member, an expansible member interposed between the abutment and the actuating member, a freely rotatable sleeve adapted to support the expansible member in normal position, and means for forcing the said expansible member against the abutment.

3. An apparatus of the class described, comprising an expansible member, a freely rotatable sleeve to support said expansible member when in normal position, a hub member, and means within the hub member to force said expansible member against the hub member.

4. An apparatus of the class described comprising a hub, an axle, an expansible member normally out of contact with the hub member, means within the hub for forcing the expansible member against the hub, and means rotatable about the axle for spacing the expansible member from the axle.

5. A brake apparatus of the class described comprising an axle, a hub member, a freely rotatable coil supporting member on the axle, a coil on said member, means for anchoring one end of said coil on said axle and means engaging the other end of the coil for expanding the same against said hub member.

6. In a brake device of the class described, an axle, a hub, a spiral braking element having convolutions of progressively increasing width surrounding said axle and adapted to be expanded into engagement with said hub, freely rotatable means for holding said braking element from contacting with said axle, and means for expanding said braking element into engagement with said hub.

7. In a brake construction of the class described, the combination with an axle and a hub rotatably mounted thereon, of a spiral braking element, a sleeve freely rotatable mounted on said axle and supporting said braking element, an abutment fixed to said axle and engaging one end of said braking element for anchoring the same, an actuating member rotatably mounted on said axle and engaging the other end of said braking element for expanding the same and means for rotating said actuating member.

8. In a brake construction of the class described, the combination with an axle and a hub rotatably mounted thereon, of a spiral braking element, a sleeve freely rotatable mounted on said axle and supporting said braking element, an abutment fixed to said axle and engaging one end of said braking element for anchoring the same, an actuating member rotatably mounted on said axle and engaging the other end of said braking element for expanding the same and means for rotating said actuating member, the convolutions of said spiral braking element progressively increasing in width toward the anchored end whereby differential braking pressures are obtained in dependence upon the braking effort exerted.

9. In a brake device of the class described, an axle, a hub rotatably mounted thereon, a sleeve rotatably mounted on said axle, an expansible spiral braking element having its convolutions gradually increasing in width from one end to the other mounted on said sleeve, an abutment member rigidly fixed to said axle and engaging one end of said spiral element for anchoring the same, an actuating member rotatably mounted on said axle and engaging the other end of said spiral for exerting an unwrapping force thereon for expanding the same into engagement with said hub, the convolutions of said spiral increasing in width from said actuating member to said abutment, and means for rotating said actuating member.

10. In a brake construction of the class described, the combination with an axle and a hub rotatably mounted thereon, of a spiral braking element, a sleeve freely mounted on said axle and supporting said braking element, a fixed abutment engaging one end of said braking element for anchoring the same, an actuating member engaging the other end of said braking element for applying an unwrapping force thereto to expand the same into engagement with said hub and means for actuating said actuating member.

11. In a brake construction, an axle, a hub member, means at opposite ends of the hub member for mounting the same upon the axle, a braking element for the hub member located therewithin between the mounting means, and means independent of the mounting means and the load carried thereby extending within the hub member for actuating the braking element.

12. In a brake construction, an axle, a hub member, bearings for the hub member extending within opposite ends thereof, a braking element for the hub member located therewithin between the bearings, and means extending within one of the bearings and independent of the load for actuating the braking element.

13. In a brake construction, an axle, a hub member, bearings for the hub member at opposite ends thereof, a braking element for the hub member located therewithin between the bearings, means extending within one of the bearings for actuating the braking element, and means independent of the actuating means for supporting the bearings upon the axle.

14. In a brake construction, an axle, a hub member, bearings for the hub member at opposite ends thereof, a braking element for the hub member located therewithin between the bearings, means for supporting one of the bearings upon the axle, said means having a portion spaced from the axle, and means extending through the space for actuating the braking element.

15. In a brake construction, an axle, a hub member, bearings for the hub member at opposite ends thereof, a spiral braking element within the hub member between the bearings engageable with the hub member, means for supporting one of the bearings upon the axle engaging one of the ends of the spiral braking element for limiting its movement in one direction, means for supporting the other of the bearings upon the axle, and means independent of the last mentioned means and extending through the last mentioned bearing and engaging the other of the ends of the spiral braking element for actuating the latter.

In testimony whereof we affix our signatures.

HOWARD F. DIXON.
PAUL WEILAND.